(12) United States Patent
Yoon

(10) Patent No.: US 9,068,607 B1
(45) Date of Patent: Jun. 30, 2015

(54) DCT CONTROL METHOD FOR VEHICLE

(71) Applicant: Hyundai Motor Company, Seoul (KR)

(72) Inventor: Young Min Yoon, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/329,722

(22) Filed: Jul. 11, 2014

(30) Foreign Application Priority Data

Dec. 18, 2013 (KR) .................. 10-2013-0157746

(51) Int. Cl.
  B60W 10/02 (2006.01)
  B60W 10/113 (2012.01)
  F16D 48/06 (2006.01)
  B60W 10/10 (2012.01)

(52) U.S. Cl.
  CPC .............. *F16D 48/06* (2013.01); *B60W 10/02* (2013.01); *B60W 10/10* (2013.01)

(58) Field of Classification Search
  CPC .............. B60W 10/02; B60W 10/113; B60W 2510/1015; F16H 2061/1284
  USPC ................................................ 701/51, 53, 67
  See application file for complete search history.

(56) References Cited

U.S. PATENT DOCUMENTS

| | | | |
|---|---|---|---|
| 2004/0224820 A1* | 11/2004 | Matsumura et al. | 477/107 |
| 2006/0185459 A1* | 8/2006 | Matsumura et al. | 74/335 |
| 2010/0241325 A1* | 9/2010 | Glatthaar et al. | 701/58 |
| 2012/0312656 A1* | 12/2012 | Bowman et al. | 192/53.1 |
| 2013/0245901 A1* | 9/2013 | Arai | 701/51 |

FOREIGN PATENT DOCUMENTS

| | | |
|---|---|---|
| JP | 2008-039114 A | 2/2008 |
| JP | 2013-83330 A | 5/2013 |
| JP | 2013-083330 A | 5/2013 |
| KR | 1020100091494 A | 8/2010 |
| KR | 1020120038797 A | 4/2012 |
| KR | 10-2013-0007844 A | 1/2013 |

* cited by examiner

*Primary Examiner* — Edwin A Young
(74) *Attorney, Agent, or Firm* — Morgan, Lewis & Bockius LLP

(57) ABSTRACT

A Dual Clutch Transmission control method may include a breakage determining step that determines whether an input shaft speed sensor breaks down, a reference securing step that disengages all shift gears connected to a non-driven input shaft and engages a clutch connected to the non-driven input shaft, when it is determined that the input shaft speed sensor broke down, and a gear shifting step that disengages the clutch connected to the non-driven input shaft and engages a shift gear of a desired shift range in accordance with a shifting instruction when the instruction for shifting to any one desired shift range of shift ranges connected to the non-driven input shaft is given after the reference securing step.

4 Claims, 5 Drawing Sheets

DCT CONTROL METHOD FOR VEHICLE

CROSS-REFERENCE(S) TO RELATED APPLICATION

The present application claims priority of Korean Patent Application Number 10-2013-0157746 filed on Dec. 18, 2013, the entire contents of which application is incorporated herein for all purposes by this reference.

BACKGROUND

1. Field of the Invention

The present invention relates to a DCT (Dual Clutch Transmission) control method of a vehicle, and more particularly, to a technology of shifting when an input shaft speed sensor of a DCT breaks down.

2. Description of Related Art

Some of DCTs mounted on vehicles calculate the output speed of a transmission by performing inverse calculation of the vehicle speed obtained by a wheel speed sensor without using an output shaft speed sensor.

Accordingly, when the input shaft speed sensor of the DCTs brakes, the slip amount is not determined in the synchronizing process for engaging a shift gear and gear shift control cannot be smoothly performed, so limp-home control of single clutch shift control (odd-to-odd/even-to-even) is performed without controlling the shaft for the broken input shaft speed sensor.

In this driving, the driving performance is remarkably decreased in comparison to a double clutch shift control, and particularly, in odd-to-odd driving, backward motion is impossible.

For reference, the 'engaging a shift gear' means a configuration in which, in an synchronized-engagement type shifting mechanism, the shift gears substantially forming the gear ratio are always engaged and make a pair of each shift range, when the sleeve of the synchronizing device is engaged with one shift gear of any one pair of shift gears in the pairs of shift gears engaged in advance, shifting is performed by the corresponding pair of shift gears and power is transmitted, in detail, it means that the sleeve of the synchronizing device is engaged with one shift gear for a desired shift range.

Accordingly, 'disengagement of a shift gear' described below means that the sleeve of the synchronizing device is substantially disengaged from a shift gear into a neutral state.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a DCT control method for vehicle which can secure driving stability and commercial value of a vehicle because it can perform normal double clutch control without performing limp-home driving even if an input shaft speed sensor of a transmission breaks down.

In an aspect of the present invention, a Dual Clutch Transmission control method may include a breakage determining step that determines whether an input shaft speed sensor breaks down, a reference securing step that disengages all shift gears connected to a non-driven input shaft and engages a clutch connected to the non-driven input shaft, when it is determined that the input shaft speed sensor broke down, and a gear shifting step that disengages the clutch connected to the non-driven input shaft and engages a shift gear of a desired shift range in accordance with a shifting instruction when the instruction for shifting to any one desired shift range of shift ranges connected to the non-driven input shaft is given after the reference securing step.

The gear shifting step may include a clutch disengaging process that disengages the clutch connected to the non-driven input shaft, a slip amount determining process that determines the initial slip amount that a synchronizing device may have to account for at the desired shift range by considering an engine speed when the clutch is disengaged as a speed of the non-driven input shaft, and a position control process that finishes shifting by engaging the shift gear of the desired shift range by controlling the synchronizing device in a position control in consideration of the initial slip amount.

The gear shifting step may include a shift type determining process that determines whether shifting according to a shifting instruction is shift-to-lower gear in acceleration, a clutch disengaging process that disengages the clutch connected to the non-driven input shaft, when it is not shift-to-lower gear in acceleration, as a result of the shift type determining process, a slip amount determining process that determines the initial slip amount that the synchronizing device of the desired shift range may have to account for by considering the engine speed when the clutch is disengaged as the speed of the non-driven input shaft, and a position control process that finishes shifting by engaging the shift gear of the desired shift range, after the slip amount determining process, by controlling the synchronizing device in a position control in consideration of the initial slip amount.

The gear shifting step may further include a standby process that stands by until the engine speed reaches a desired synchronization speed when it is shift-to-lower gear in acceleration as the result of the shift type determining process, a post-standby disengaging process that disengages the clutch connected to the non-driven input shaft when the engine speed reaches the desired synchronization speed by the standby process, and a rapid driving process that rapidly drives the synchronizing device more than the position control process so that the shift gear of the desired shift range is engaged immediately when the clutch is disengaged by the post-standby disengaging process.

According to the present invention, it is possible to ensure driving stability and commercial value of a vehicle by performing not limp-home driving, but normal double clutch control, even if the input shaft speed sensor of a transmission breaks down.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
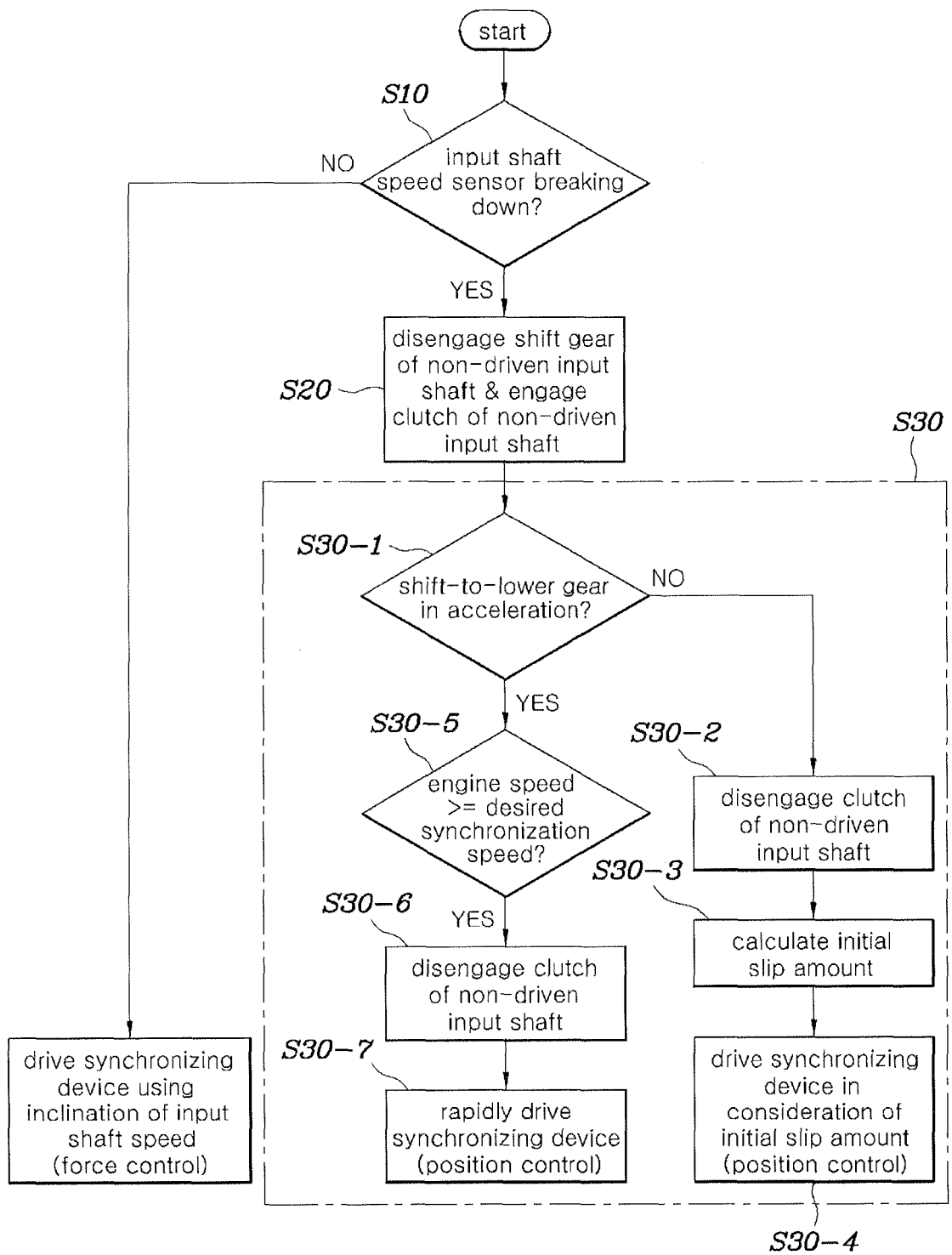
FIG. 1 is a flowchart illustrating a DCT control method for vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an exemplary embodiment of a DCT control method of the present invention includes: a breakdown determining step S10 that determines whether an input shaft speed sensor breaks down, a reference securing step S20 that disengages all shift gears connected to a non-driven input shaft and engages a clutch connected to the non-driven input shaft, when it is determined that the input shaft speed sensor broke down, and a gear shifting step S30 that disengages the clutch connected to the non-driven input shaft and engages the shift gear of the desired shift range in accordance with a shifting instruction when the instruction for shifting to any one desired shift range in the shift range connected to the non-driven input shaft is given after the reference securing step S20.

That is, when it is determined that the input shaft speed sensor broke down in the breakdown determining step S10, the speed of the non-driven input shaft is made the same as the engine speed through the reference securing step S20 and then the gear shirting step S30 is performed using it so that double clutch shift control can be performed equally to the normal case even if the input shaft speed sensor breaks down, and accordingly, smooth driving performance of a vehicle can be secured and maintained.

Obviously, as the result of the breakdown determining step S10, when the input shaft speed sensor is in the normal state, as normal control, a shift gear is engaged with a synchronizing device in force control, using the inclination from speed information from the corresponding input shaft speed sensor.

The gear shifting step S30 includes: a shift type determining process S30-1 that determines whether shifting according to a shifting instruction is shift-to-lower gear in acceleration, a clutch disengaging process S30-2 that disengages the clutch connected to the non-driven input shaft, when it is not shift-to-lower gear in acceleration, as the result of the shift type determining process S30-1, a slip amount calculating process S30-3 that calculates the initial slip amount that the synchronizing device has to account for at the desired shift range by considering the engine speed when the clutch is disengaged as the speed of the non-driven input shaft, and a position control process S30-4 that finishes shifting by engaging the shift gear of the desired shift range by controlling the synchronizing device in a position control way in consideration of the initial slip amount.

Further, the gear shifting step S30 includes: a standby process S30-5 that stands by until the engine speed reaches a desired synchronization speed when it is shift-to-lower gear in acceleration as the result of the shift type determining process S30-1, a post-standby disengaging process S30-6 that disengages the clutch connected to the non-driven input shaft when the engine speed reaches the desired synchronization speed by the standby process S30-5, and a rapid driving process S30-7 that rapidly drives the synchronizing device more than the position control process S30-4 so that the shift gear of the desired shift range is engaged immediately when the clutch is disengaged by the post-standby disengaging process S30-6.

That is, in the exemplary embodiment, a shift gear is engaged in accordance with the standby process S30-5, the post-standby disengaging process S30-6, and the rapid driving process S30-7 and shifting is finished only when the shift type is shift-to-lower gear in acceleration as the result of the shift type determining process S30-1 in the gear shifting step S30, whereas in another shift types, that is, shift-to-upper gear in acceleration, shift-to-upper gear in deceleration, and shift-to-lower gear in deceleration, a shift gear is engaged by the clutch disengaging process S30-2, the slip amount calculating process S30-3, and the position control process S30-4 and shifting is finished.

However, even in the shift-to-lower gear in acceleration, shifting can be performed by the clutch disengaging process S30-2, slip amount calculating process S30-3, and position control process S30-4, similar to other types of shifting, so the same control can be performed for all of shifting instructions without the shift type determining process S30-1.

In the exemplary embodiment, however, shifting can be performed in a specific control process through the shift type determining process S30-1, as described above, to reduce uncertainty in kick-down shifting that is the shift-to-lower gear in acceleration, in comparison to another case.

Figure 2:
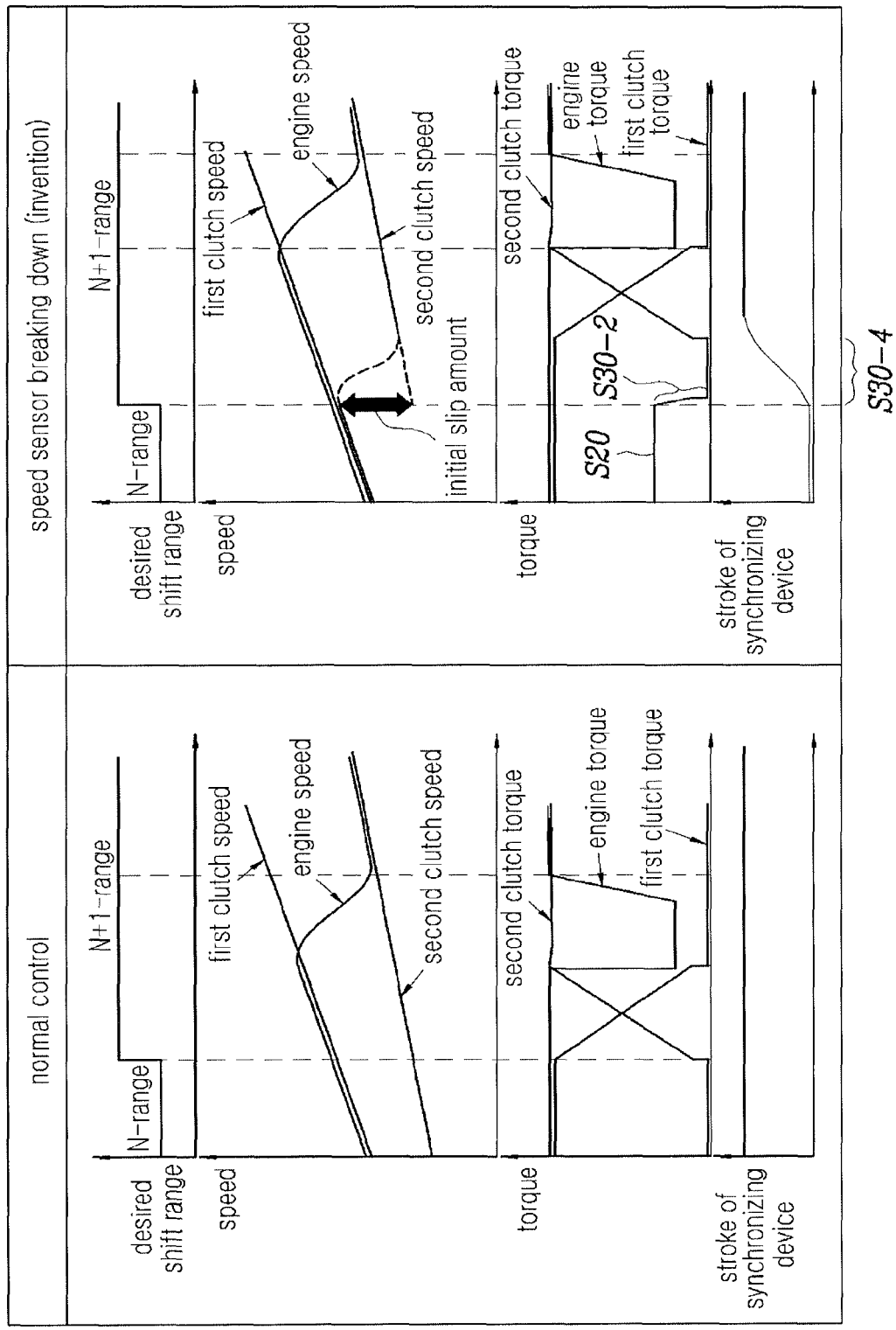
FIG. 2 is a view comparing normal control with control by the present invention in shift-to-upper gear in acceleration.

FIG. 2 is a graph comparing the shift-to-upper gear in acceleration according to an exemplary embodiment of the present invention with a normal case of the related art.

Referring to the left graph for normal control, a desired shift range is changed up to the N+1-range from the N-range, accordingly, shifting is performed from the N-shift range connected to a first clutch to the N+1-range connected to the second clutch. Therefore, it can be seen from the graph that the engine speed is the same as the speed of the first clutch because the first clutch 1 is initially engaged, but it becomes the same as the speed of the second clutch when the shifting is finished.

A torque phase where the torque of the first clutch and the second clutch changes is positioned before the inertia phase where the engine speed changes. When the torque phase where the torque of the first clutch is removed and the torque of the second clutch increases is ended, shifting control is performed so that the torque of the engine speed is synchronized with the speed of the second clutch to reduce the torque of the engine, in which the shift gear of the N+1-range connected to the second clutch has been engaged before shifting, that is, when the current shift range is the N-range, therefore, shifting control under a normal situation is finished only by substantially switching two clutches to be engaged, as described above.

The normal control as described above is possible when the current shift range is the N-range and the input shaft speed sensor is in a normal state and the shift gear of the N+1-range connected to the non-driven input shaft is engaged in advance with the current range being the N-range. When the input shaft speed sensor breaks down, as the presupposition of the present invention, it is impossible to calculate the slip amount in synchronization for engaging a shift gear and the desired shift gear is not engaged, so that it is difficult to perform double clutch shift control for shifting from a shift range connected to any one clutch to a shift range connected to another clutch, as described above.

When it is difficult to engage the shift gear of the desired shift range to be newly shifted due to a breakdown of the input shaft speed sensor, the present invention, as shown on the right side of FIG. 2, performs the reference securing step S20 that makes the speed of the non-driven input shaft be the same as the engine speed and the speed of the in-driving input shaft, by engaging the second clutch, the clutch connected to the non-driven input shaft, after the breakdown determining step S10.

Obviously, all of shift gears connected to the non-driven input shaft should be disengaged and not be able to transmit power.

For reference, in the figure, the speed of the first clutch means the speed of the in-driving input shaft and the speed of the second clutch has the same meaning as the speed of the non-driven input shaft.

With the same state of the non-driven input shaft speed as the engine speed, when an instruction for shifting to the N+1-range is generated, since it is not the shift-to-lower gear in acceleration, based on the shift type determining process S30-1, as shown in the figure, the clutch disengaging process S30-2 that disengages the second clutch, the clutch connected to the non-driven input shaft is performed, the initial slip amount that the synchronizing device has to account for at the N+1-range is calculated from the engine speed when the clutch is disengaged, which is considered as the rotation speed of the non-driven input shaft in the slip amount calculating process S30-3, and then the synchronizing device is controlled in the way of not force control, but position control in consideration of the calculated result in the position control process S30-4, thereby the shift gear is engaged.

After the desired shift gear is engaged, as described above, similar to normal shift control, shifting is finished by reducing the torque of the engine and synchronizing the engine speed to the speed of the second clutch after torque handover in which the torque of the second clutch is increased and the torque of the first clutch is removed, that is, the torque phase.

Figure 4:
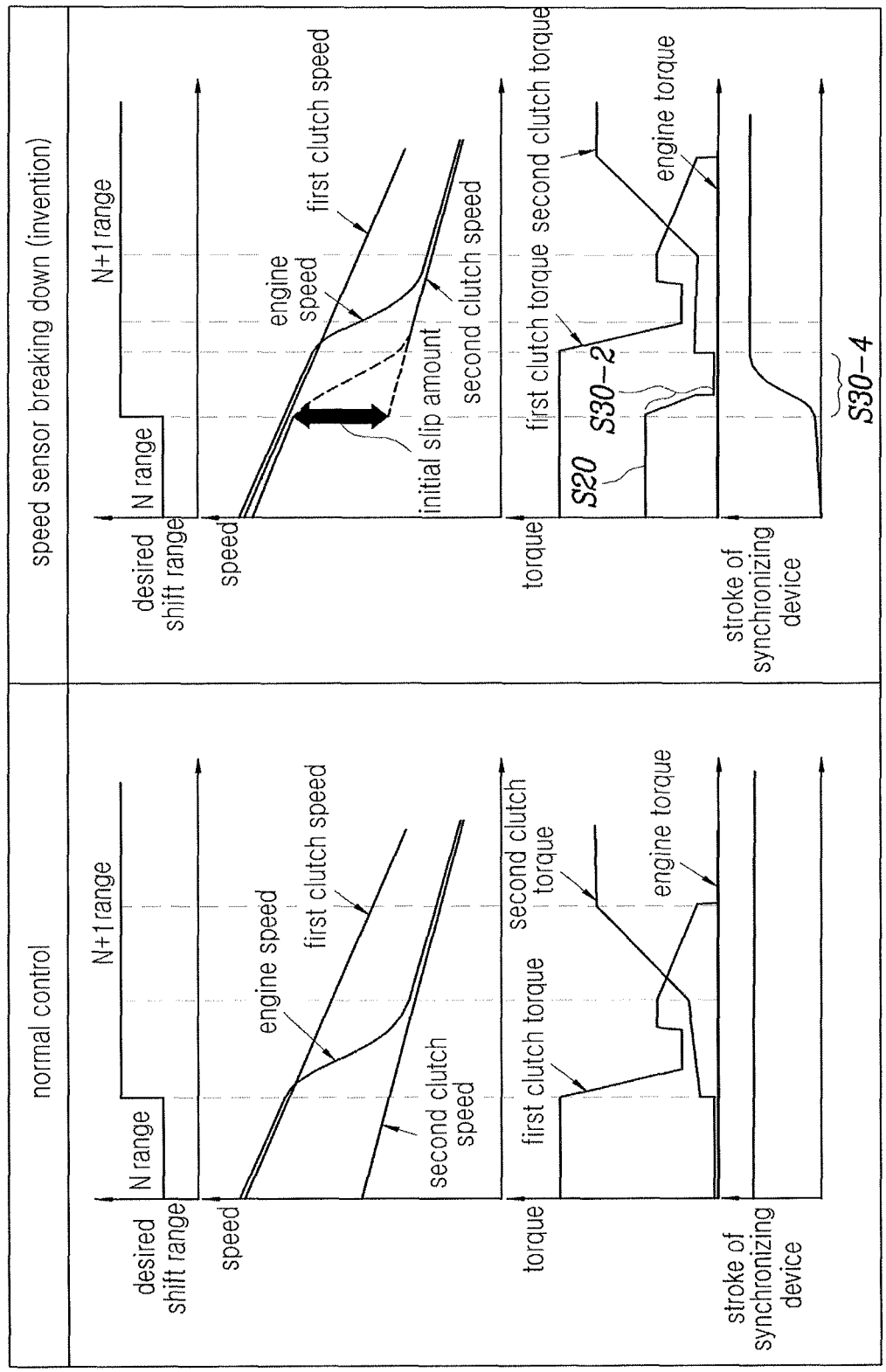
FIG. 4 is a view comparing normal control with control by the present invention in shift-to-upper gear in deceleration.
Figure 5:
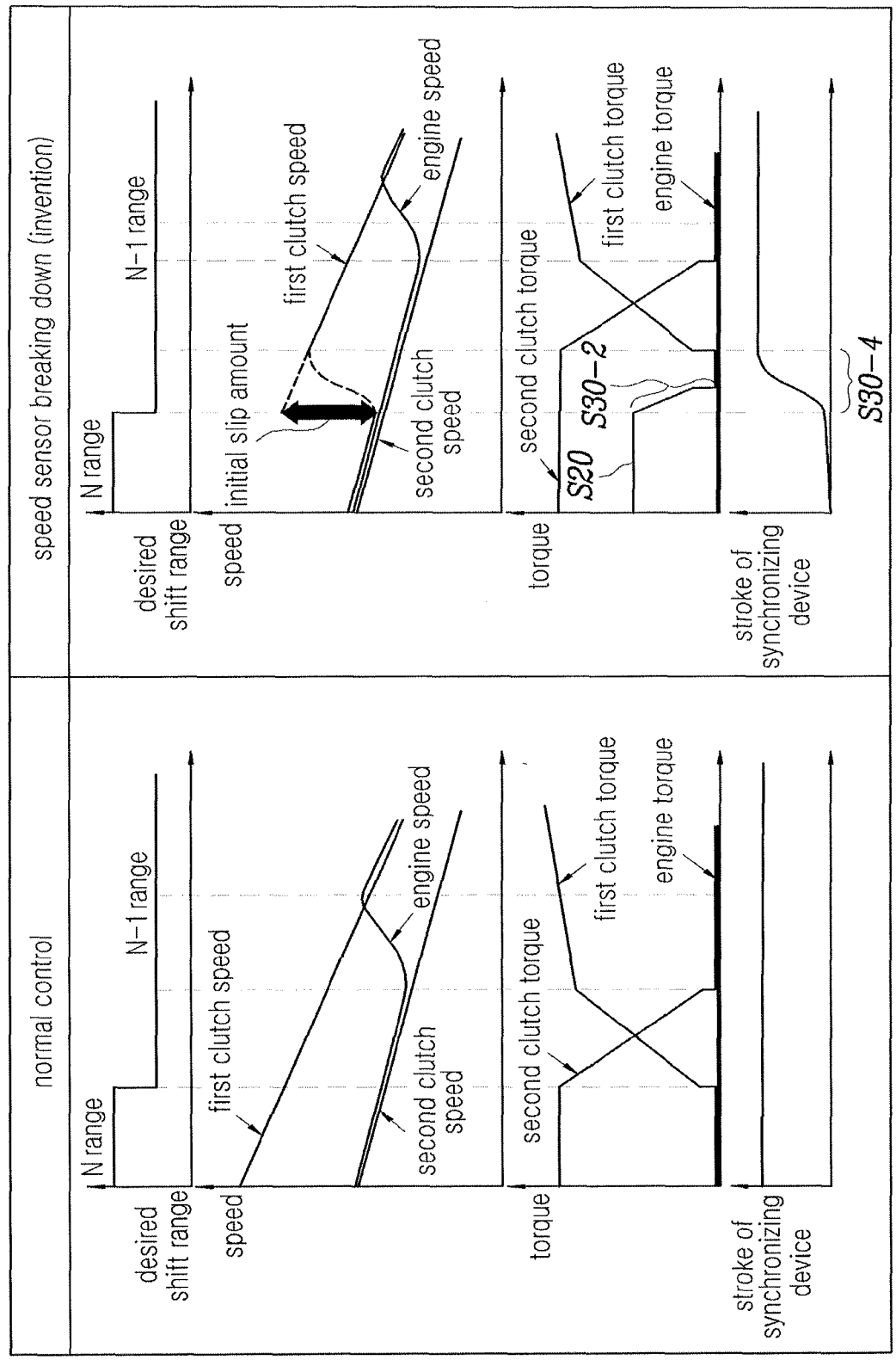
FIG. 5 is a view comparing normal control with control by the present invention in shift-to-lower gear in deceleration.

The control method described above is equally applied to the shift-to-upper gear in deceleration of FIG. 4 and the shift-to-lower gear in deceleration of FIG. 5, so the detailed description is not provided.

Figure 3:
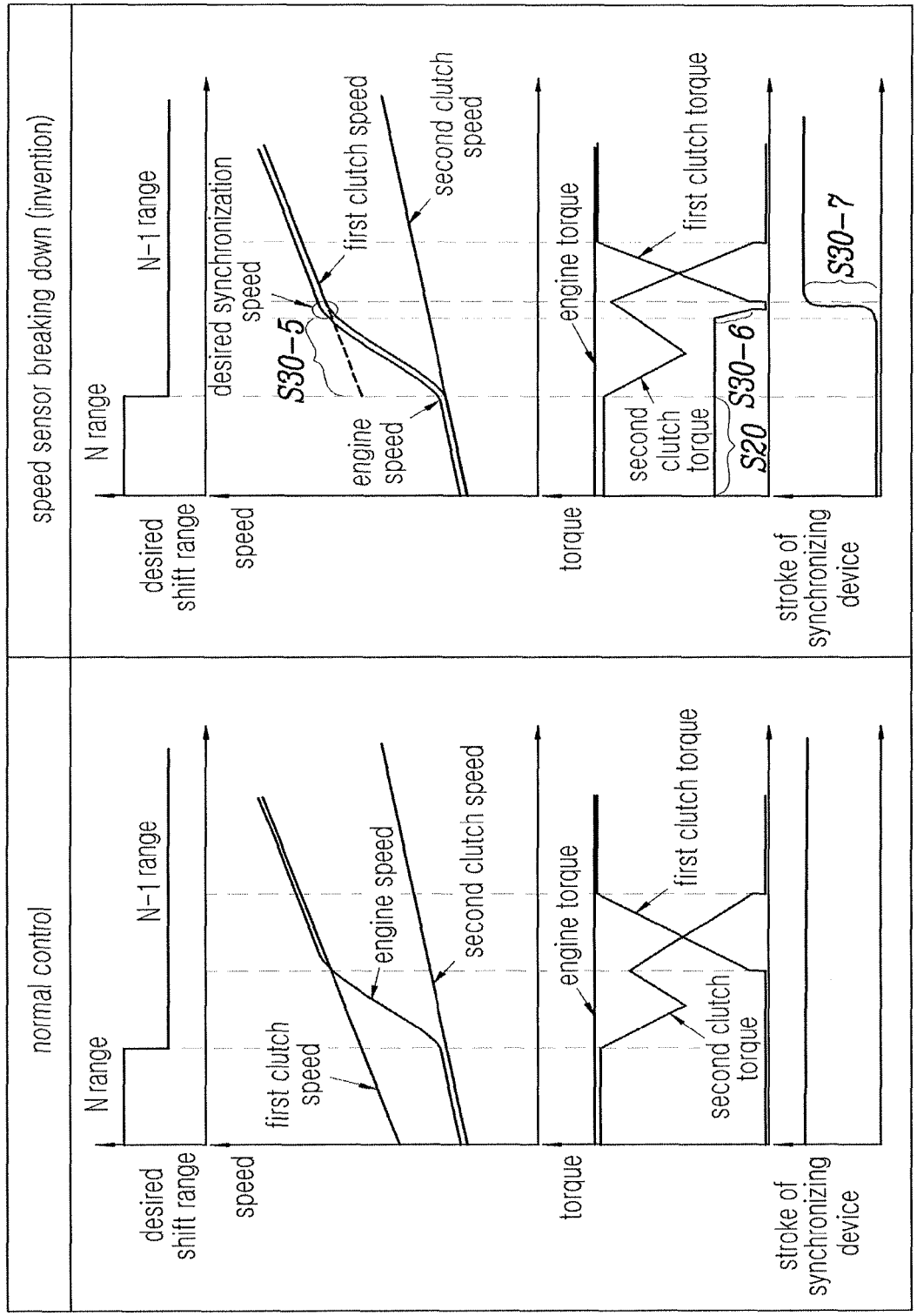
FIG. 3 is a view comparing normal control with control by the present invention in shift-to-lower gear in acceleration.

FIG. 3 shows the shift-to-lower gear in acceleration, in which in shifting from the N-range to the N+1-range under normal control, since the N-range that is the current shift range is the shift range connected to the second clutch, an inertia phase where the engine speed is separated from the speed of the second clutch and increased to the speed of the first clutch by disengaging a little the second clutch is generated first, and then the torque phase where the torque of the second clutch is completely removed and the torque of the first clutch is increased is performed and shifting is finished, and since it is still a normal case, the shift gear of the N−1-range is engaged in advance with the current range being the N-range.

Upon examination of the operation of the present invention when the speed sensor breaks down, the breakage determining step S10 and the reference securing step S20 are performed in the same way, and since it is the shift-to-lower gear in acceleration as the result of the shift type determining process S30-1, the standby process S30-5 that stands by until the engine speed reaches the desired synchronization speed with the first clutch, which is the clutch of the non-driven input shaft, keeping engaged is performed.

The desired synchronization speed means the speed where the engine speed converges to the speed of the input shaft connected with the first clutch and rotated by the power transmitted back to the input shaft through the output shaft from a driving wheel, when the shift gear of the N−1-range that is the desired shift range has been engaged, similar to normal control, that is, the speed where the engine is synchronized to the first clutch in a normal state.

When the engine speed reaches the desired synchronization speed by the standby process S30-5, the first clutch, the clutch connected to the non-driven input shaft is disengaged through the post-standby disengaging process S30-6, and after the first clutch is disengaged, the synchronizing device is rapidly moved to engage the shift gear of the N−1-range through the rapid driving process S30-7.

With the first clutch disengaged by the post-standby disengaging process S30-6, considering the gear ratio of the shift gears of the N−1-range that is the desired shift range, the rotation speed of the input shaft connected with the first clutch is substantially the same as the rotation speed of the output shaft, so that there is little slip in the synchronizing device for engaging the shift gears of the N−1-range. Accordingly, the synchronizing device is engaged by the rapid driving process S30-7, faster than the position control process S30-4.

When the clutch is connected to the non-driven input shaft is engaged right until the synchronizing device is engaged and the synchronizing device is rapidly engaged at the point of time when the slip amount that the synchronizing device has to account for is minimized, uncertainty is reduced accordingly and shifting can be performed more completely.

Obviously, the control method for the shift-to-lower gear in acceleration can be used for other types of shifting.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A Dual Clutch Transmission control method comprising:
- a breakage determining step that determines whether an input shaft speed sensor breaks down;
- a reference securing step that disengages all shift gears connected to a non-driven input shaft and engages a clutch connected to the non-driven input shaft, when it is determined that the input shaft speed sensor broke down; and
- a gear shifting step that disengages the clutch connected to the non-driven input shaft and engages a shift gear of a desired shift range in accordance with a shifting instruction when the instruction for shifting to any one desired shift range of shift ranges connected to the non-driven input shaft is given after the reference securing step.

2. The method of claim 1, wherein the gear shifting step includes:
- a clutch disengaging process that disengages the clutch connected to the non-driven input shaft;
- a slip amount determining process that determines the initial slip amount that a synchronizing device has to account for at the desired shift range by considering an engine speed when the clutch is disengaged as a speed of the non-driven input shaft; and
- a position control process that finishes shifting by engaging the shift gear of the desired shift range by controlling the synchronizing device in a position control in consideration of the initial slip amount.

3. The method of claim 1, wherein the gear shifting step includes:
- a shift type determining process that determines whether shifting according to a shifting instruction is shift-to-lower gear in acceleration;
- a clutch disengaging process that disengages the clutch connected to the non-driven input shaft, when it is not shift-to-lower gear in acceleration, as a result of the shift type determining process;
- a slip amount determining process that determines the initial slip amount that the synchronizing device of the desired shift range has to account for by considering the engine speed when the clutch is disengaged as the speed of the non-driven input shaft; and
- a position control process that finishes shifting by engaging the shift gear of the desired shift range, after the slip amount determining process, by controlling the synchronizing device in a position control in consideration of the initial slip amount.

4. The method of claim 3, wherein the gear shifting step further includes:
- a standby process that stands by until the engine speed reaches a desired synchronization speed when it is shift-to-lower gear in acceleration as the result of the shift type determining process;
- a post-standby disengaging process that disengages the clutch connected to the non-driven input shaft when the engine speed reaches the desired synchronization speed by the standby process; and
- a rapid driving process that rapidly drives the synchronizing device more than the position control process so that the shift gear of the desired shift range is engaged immediately when the clutch is disengaged by the post-standby disengaging process.

* * * * *